(No Model.)
J. B. BLOOM.
THRASHING MACHINE SEPARATOR.
No. 263,675. Patented Sept. 5, 1882.
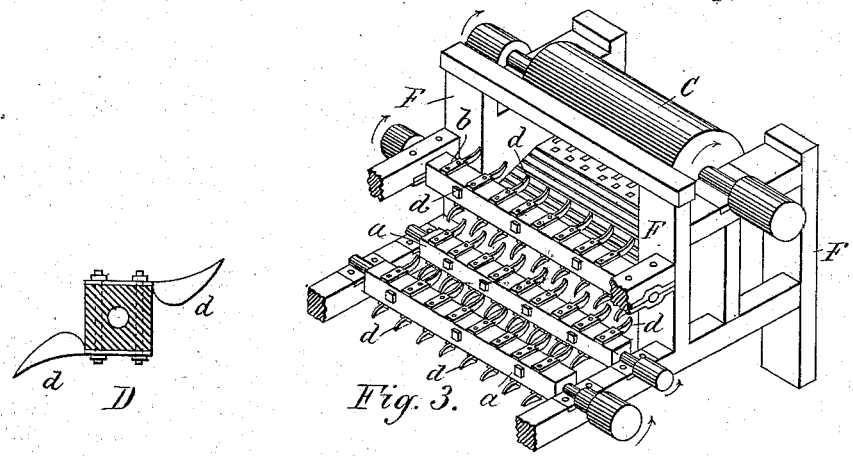
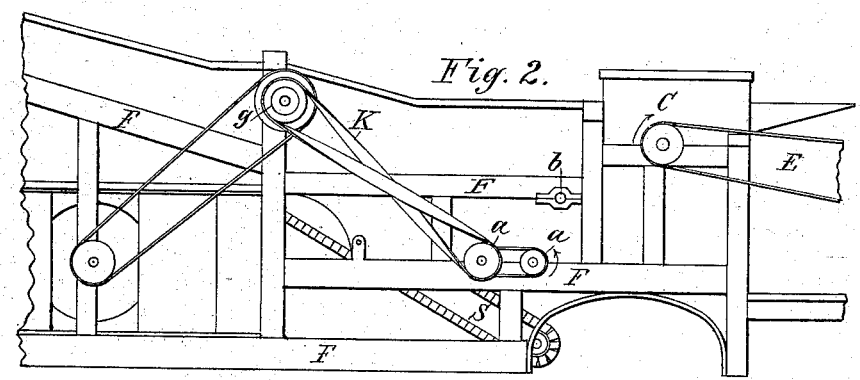
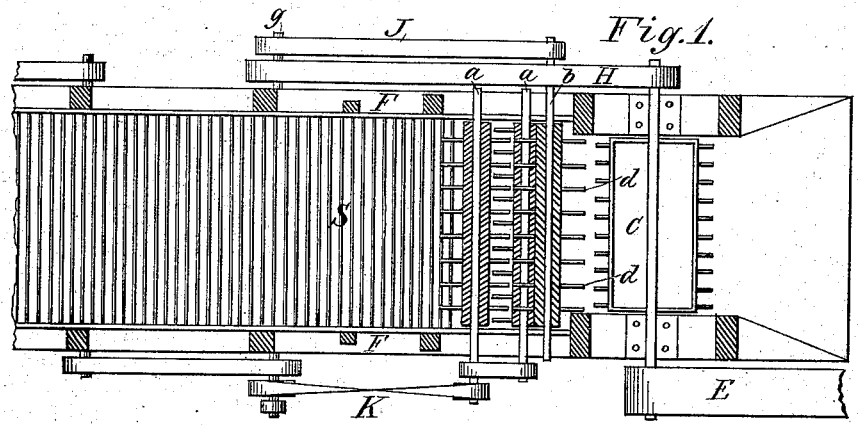
Witnesses.
Henry E. McCune
Bernhard Ettlinger
Inventor:
John B. Bloom

UNITED STATES PATENT OFFICE.

JOHN B. BLOOM, OF NEAR DIXON, CALIFORNIA.

THRASHING-MACHINE SEPARATOR.

SPECIFICATION forming part of Letters Patent No. 263,675, dated September 5, 1882.

Application filed December 15, 1881. (No model.)

*To all whom it may concern:*

Be it known that I, JOHN B. BLOOM, a citizen of the United States, residing near the town of Dixon, in the county of Solano and State of California, have invented a new and useful Improvement in Thrashing-Machine Separators; and I do hereby declare that the following is a full, clear, and exact description of the invention, which will enable others skilled in the art to which it appertains to make and use the same.

My invention relates to improvements in thrashing-machine separators.

The object of my improvements is to break the straw up fine immediately after leaving the cylinder of the thrasher, in order to cause a more perfect separation of the grain from the straw, and to prevent the grain from passing over with the straw.

The mechanism of my improvement is illustrated in the accompanying drawings, in which—

Figure 1 is a top view of the thrasher as it appears after the removal of the top covering. Fig. 2 is a side view of the thrasher as it appears when the belts are connected and the thrasher is ready for operation. Fig. 3 is an isometrical view of a portion of a thrasher, showing the revolving horizontal shafts $a\ a$ and $b$ in their proper positions, placed in the rear of the cylinder C.

Similar letters in the several figures refer to similar parts.

The revolving shafts $a\ a\ b$, with their projecting teeth or pins, I call "breaker-shafts," their office being to receive the straw from the thrashing-cylinder C and break it into short pieces previous to its entering upon the separator, which operation is performed by said breakers, owing to the fact that the breaker $b$ receives the straw from the thrashing-cylinder and transfers it to the breakers $a\ a$, both of which revolve in a direction opposite to that of $b$. They can be constructed out of either wood or metal, and can be made in any form, with metal teeth $d\ d\ d$, which are made nearly double the length of ordinary cylinder-teeth of thrashers, or made equivalent to teeth shown on the detail drawing, D. There are two or more rows of teeth to each breaker-shaft. The teeth are slightly curved, forming broad teeth at the base or point of attachment to the shaft and gradually tapering to a point at their ends. The breaker-shafts have their bearings in boxes secured to the frame-work of the separator in F F in the ordinary manner, and are located below and a few inches back of the cylinder C. The upper breaker-shaft, $b$, revolves in the same direction and in conjunction with the cylinder of the thrasher, or otherwise, if desired, and the lower breaker-shafts, $a\ a$, revolve in the opposite direction to the cylinder C of the thrasher, so that when the straw passes to the breakers $b, a$, and $a$ immediately after leaving the cylinder C, it is there broken, as above described, much finer than by any other means heretofore employed before it reaches the grain-belt S or beater-strip on shaft $g$.

The breaker-shafts $b\ a\ a$ may be driven by belts passing around pulleys, or from cog-wheel gearing connected with the separator-shafts.

I am aware that prior to my invention thrasher-separators with beater-strips and agitators which set farther back than mine in the machine have been made and operated. I therefore do not claim any such combination; but What I do claim as my invention, and desire to secure by Letters Patent, is—

In a machine for thrashing grain and breaking up the straw previous to its entering upon the separating mechanism, the combination of the thrashing-cylinder C and breaking shafts or cylinders $b\ a\ a$, the shaft $b$ revolving in an opposite direction to that given to the breakers $a\ a$, substantially as and for the purpose set forth.

JOHN B. BLOOM.

Witnesses:
HENRY E. MCCUNE,
HERMAN EPPINGER.